United States Patent [19]

Biblarz et al.

[11] 4,439,980

[45] Apr. 3, 1984

[54] ELECTROHYDRODYNAMIC (EHD) CONTROL OF FUEL INJECTION IN GAS TURBINES

[75] Inventors: Oscar Biblarz; James A. Miller, both of Carmel; Ronald J. Laib, Bonita, all of Calif.

[73] Assignee: The United States of America as represented by the Secretary of the Navy, Washington, D.C.

[21] Appl. No.: 321,955

[22] Filed: Nov. 16, 1981

[51] Int. Cl.³ ............................................. F02C 7/22

[52] U.S. Cl. ................................ 60/39.06; 60/740; 239/690; 431/8

[58] Field of Search ...................... 123/536, 537, 538; 60/39.06, 740; 431/8; 239/690, 706, 707, 708; 361/228

[56] References Cited

U.S. PATENT DOCUMENTS

| | | | |
|---|---|---|---|
| 3,110,294 | 11/1963 | Nymann | 60/39.06 |
| 3,224,485 | 12/1965 | Blomgren et al. | 431/8 |
| 3,613,993 | 10/1971 | Gourdine et al. | 239/3 |
| 3,749,545 | 7/1973 | Velkoff | 431/8 |
| 3,841,824 | 10/1974 | Bethel | 431/8 |
| 4,335,851 | 6/1982 | Hastings | 239/3 |

FOREIGN PATENT DOCUMENTS

| | | | |
|---|---|---|---|
| 54-149027 | 11/1979 | Japan | 431/8 |

*Primary Examiner*—Louis J. Casaregola
*Attorney, Agent, or Firm*—R. F. Beers; Charles D. B. Curry; William C. Daubenspeck

[57] ABSTRACT

In a gas turbine engine of the type wherein the fuel is injected through a spray injection nozzle into a combustion chamber, the improvement is a method and apparatus for modifying the characteristics of the fuel spray from the fuel injection nozzle so that fuels of higher aromatic content can be efficiently used in the engine. An electrode is disposed within the combustion chamber to provide a high strength electrostatic field in the vicinity of the injection nozzle so that the fuel spray from the nozzle becomes charged as it leaves the nozzle. The strength of the electric field is adjusted to provide a spray characteristic which produces optimum engine performance as determined by measuring an operating parameter of the engine such as the temperature of the gases exiting from the combustion chamber. An electrode structure is disclosed in which a central conductor is covered by two concentric layers of high density insulating material except at an exposed end surface which faces the injection nozzle and is disposed on its longitudinal axis. An annular passage is provided between the two layers of insulating material through which passage an inert gas is directed to provide a protective layer to insulate the exposed conductor from the flame.

10 Claims, 2 Drawing Figures

ELECTROHYDRODYNAMIC (EHD) CONTROL OF FUEL INJECTION IN GAS TURBINES

BACKGROUND OF THE INVENTION

The invention relates in general to fuel injection apparatus and, in particular, to a method and apparatus for controlling the spray characteristics of fuel injection apparatus in gas turbine engines. The invention relates especially to a method and apparatus for controlling the spray characteristics to permit fuels of varying grades to be burned efficiently in present gas turbine engine designs.

As a result of the world petroleum situation, the future availability of petroleum products is uncertain and the cost of such products is steadily increasing. In this situation, an engine which can operate efficiently on a variety of fuels has many advantages. Fuels refined to less exacting specifications are less costly than fuels refined to more exacting specifications. The problem of fuel availability is reduced if an engine can operate on a variety of fuels.

Present gas turbine engines have been designed to operate most efficiently with a standard fuel. In general, the fuel injection nozzles of these engines have been optimized for use with a fuel having a specific aromatic content. Fuels having higher aromatic content cannot be burned efficiently in these engines. Higher aromatic content fuels are more viscous so that a given nozzle will not produce the finely atomized spray need for proper combustion. Moreover, the use of a different fuel may produce increased exhaust emissions which will likely impinge on Environmental Protection Agency standards.

SUMMARY OF THE INVENTION

It is therefore an object of the present invention to provide for the efficient use of a variety of fuels in a gas turbine engine.

Another object of the present invention is to provide an inexpensive modification to existing gas turbine engines to allow the efficient use of fuels of varying aromatic content.

Another object of the present invention is to provide for controlling the characteristics of the fuel spray in gas turbine engines to allow the efficient use of a variety of fuels in the same engine.

A further object of the present invention is to provide a separately controllable means for refining the spray from a given fuel injection nozzle to provide an optimized spray when fuels more viscous than the standard fuel are used.

These and other objects are provided by the present invention in which the normal spray characteristics of the injected fuel are modified by the introduction of an electrostatic field in the vicinity of the injected fuel. A high voltage electrode is disposed so that the fuel experiences electrostatic forces as it leaves the fuel injection nozzle in addition to the original pressure and shear forces. The high voltage of the electrode charges the dielectric fuel as it emerges from the nozzle resulting in a fuel spray having modified characteristics determined by the strength of the electrostatic forces and characteristics inherent in the fuel. The voltage level of the electrode is varied to provide an overall spray characteristic which provides the most efficient engine operation for the type of fuel being used.

Other objects, advantages and features of the invention will become apparent from the following detailed description of the invention when considered in conjunction with the accompanying drawing wherein:

DESCRIPTION OF THE PREFERRED EMBODIMENT

Figure 1:
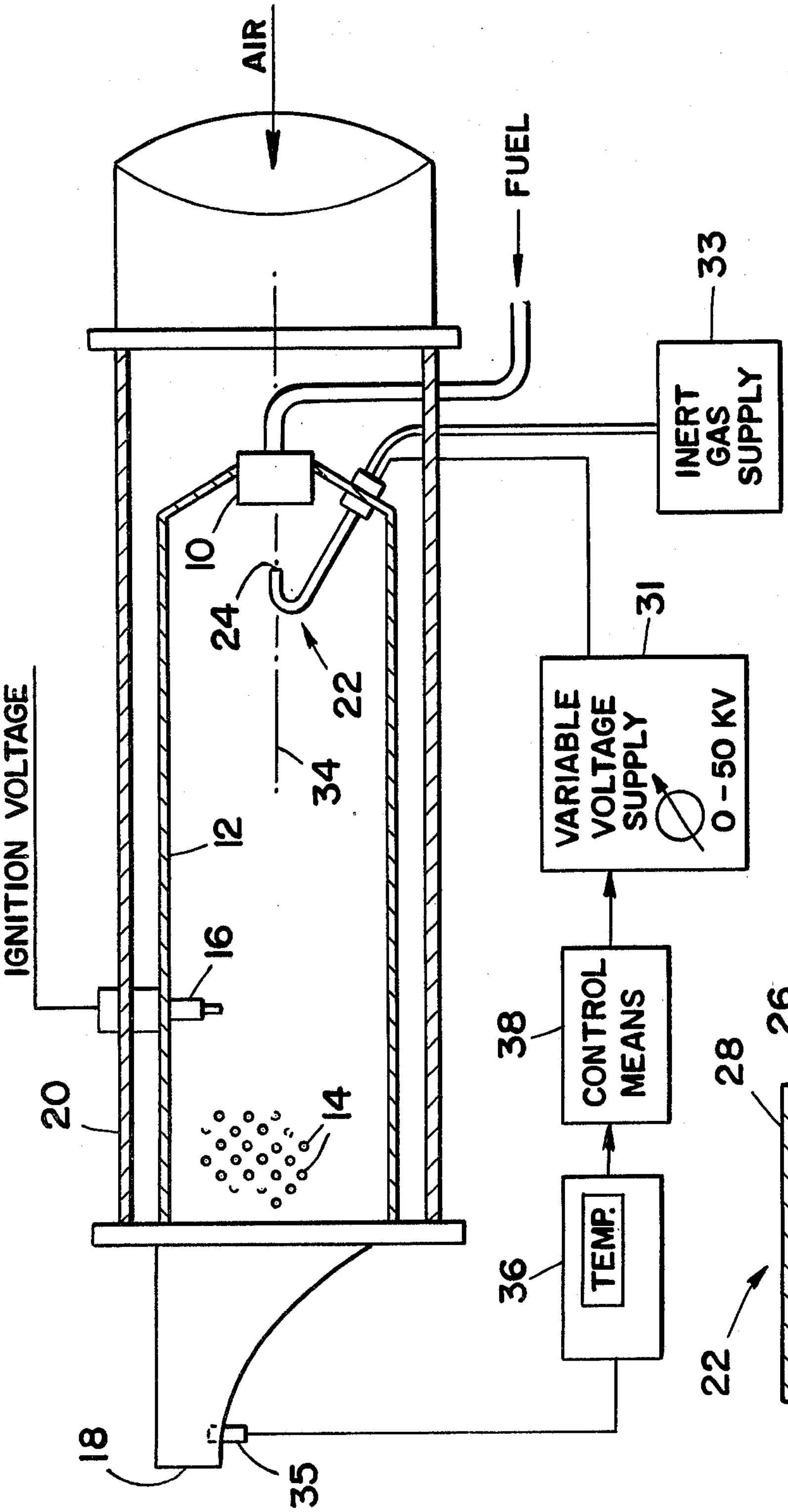
FIG. 1 is a schematic drawing illustrating a preferred embodiment of the present invention as employed in a conventional gas turbine aircraft engine.

Referring now to FIG. 1, there is shown a combustion unit of a representative gas turbine aircraft engine. Fuel is fed under variable pressure to an injector nozzle 10 which is disposed at the front end of a cylindrical liner 12. The front end and the cylindrical side wall of the liner 12 have apertures 14 (only a few apertures are shown for clarity) to allow air under pressure to mix with the fuel injected from the nozzle 10. A spark plug 16 extends into the liner 12 downstream from the injector nozzle 10 to ignite the air-fuel mixture within the liner. The downstream end of the liner 12 converges to an exhaust opening 18 to produce kinetic energy from the combustion in the liner.

A typical engine will include a plurality of combustion units arranged in a circular array. The plurality of combustion units are disposed within an outer housing, represented in the FIG. 1 by cylinder 20 which is shown to fit only one such burner, into which the air is injected. The outer cylinder 20 is enclosed around the side wall of the liner 12 upstream from the converging section so that air directed into the outer cylinder flows into the liner through the apertures 14 in the front end and side wall.

The structure of the combustion unit and, in particular, the structure of the nozzle 10, is designed so that the performance of the unit is optimum when the unit is used with a fuel refined to a particular specification. The characteristics of the spray from the nozzle 10, such as conical angle and droplet size and distribution, provide optimum efficiency when the designed-for fuel is used. However, the efficiency of the combustion unit is reduced when a fuel other than the designed-for fuel is used. This reduction in efficiency is primarily due to the fact that the injector nozzle 10 can not provide a spray having the optimum burning characteristics when used with a fuel which is refined to other than the designed-for specifications.

It is the primary purpose of the present invention to permit a variety of fuels to be efficiently burned in the combustion unit without any modification to the injector nozzle 10 and a minimum of modification (if any) to the existing structure of the rest of the combustion unit. In the present invention, the normal spray characteristics of the injected fuel are modified by an electrostatic field which is introduced in the vicinity of the injected fuel. A high voltage electrode is disposed so that the fuel experiences electrostatic forces as it leaves the fuel injection nozzle. Because the combustion unit is at ground potential, the fuel is at ground potential as it passes through the injection nozzle. The high voltage of the electrode electrostatically charges the fuel as it emerges from the nozzle. This results in further atomization of the fuel in a spray in which the droplets may be controlled in both size and distribution by adjusting the strength of the electrostatic field. The equilibrium droplet size represents a balance between the electrostatic forces, which are controlled, and the surface tension forces inherent in each type of fuel. To a lesser extent the conical angle of the spray pattern may also be controlled.

Figure 2:
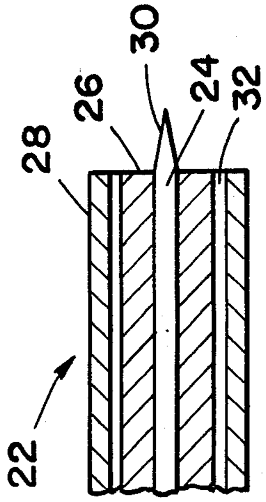
FIG. 2 is a cross-sectional drawing illustrating an electrode structure suitable for use in the embodiment of FIG. 2.

FIG. 1 illustrates an embodiment of the present invention suitable for use with the representative combustion unit shown therein. The electrode 22, as best shown in the enlarged cross-sectional view of FIG. 2, is a rod-like structure having a central conductor 24 within two concentric layers 26 and 28 of high density insulating material, such as high density ceramic material. The conductor 24 has a tapered end 30 which extends a short distance beyond the protection of the insulating layers 26 and 28. The insulating layers 26 and 28 shield the conductor 24 from the high temperatures in the combustion unit and electrically insulate the conductor from the combustion unit and the electrically-conductive flame. A variable high voltage power supply 31 is coupled to the conductor to induce a variable electric potential between the conductor 24 and the ground plane of the combustion unit.

The inner insulating layer 26 is contiguous to the conductor 24. The outer insulating layer 26 is separated from the inner layer 26 so that an annular passage 32 is formed between the two layers. Since the flame is an electrical conductor which will short the electrode conductor 24, thereby eliminating the electrostatic field and draining the power supply 31, the flame must be prevented from providing a path from the conductor 24 to the ground plane of the combustion unit. A small flow of cool inert gas, such as nitrogen, may be fed from a gas supply 33 through the annular passage 32 to provide a non-conductive layer separating the conductor 24 from the flame in the combustion unit. The small flow of inert gas required to electrically insulate the exposed tip of the conductor 24 will not deleteriously effect the combustion of the fuel in the liner 12.

The electrode 22 is disposed in the liner so that the exposed tapered end 30 of the conductor 24 is positioned on the longitudinal axis 34 of the combustion unit and faces the injection nozzle 10. The longitudinal axis 34 coincides with the centerline of the nozzle 10. This orientation provides a high voltage surface facing the grounded injection nozzle 10 and symmetrically disposed with respect to the injected fuel spray. Additionally, the relatively small exposed surface of the conductor 24 provides efficient use of the electrical power from the variable power supply 31 in producing the high strength electric field in the vicinity of the emerging fuel spray.

The electrode 22 is inserted into the liner 12 through a suitable opening in the front end of the liner 12. This avoids unnecessary disruption of the fuel spray by the physical structure of the electrode 22 and allows the placement of the electrode 22 out of the flame region as much as practical. The electrode 22 then curves so that the conductive tip 30 is positioned at the desired location on the longitudinal axis 34 and facing the injection nozzle 10.

A temperature sensing device, such as a thermocouple 35, is disposed to measure the temperature of the exit gas in the converging section of the liner 10. The temperature of the exit gas provides a simple measure of the combustion efficiency of the unit with a higher temperature generally indicating more efficient engine operation. The output of the temperature sensing device is coupled to a readout device 36 for displaying the combustion temperature.

In operation, when a fuel refined to the specifications for which the combustion unit was designed is introduced into the engine, the variable power supply 31 is set to ground potential so that the conductor 24 in the electrode 22 is at the same potential as the combustion unit. Since there is no potential difference between the fuel emerging from the nozzle 10 and the conductor 24, the spray characteristics of the emerging fuel are not effected by the presence of the electrode 22 in the combustion chamber. The combustion unit should thus operate with the designed-for fuel at its normal efficiency.

Turning now to the operation of the present invention when the fuel supplied to the combustion unit is other than the designed-for fuel, in general the operating parameters of the combustion unit such as the air/fuel ratio and the injection pressures are determined by the engine design and optimized for the designed-for fuel. Thus the conventional components of the engine operate in their normal manner at all times. According to the present invention, an electric potential is applied to the conductor 24 of the electrode structure 22 by the variable high voltage power supply 31. The potential of the conductor 24 may be either positive or negative relative to the ground potential of the combustion unit, although a positive potential has provided slightly superior control of the spray in experimental operations. Typical potentials of 0–50 KV are contemplated. The fuel emerging from the injection nozzle 10 enters the electric field which is present between the charged conductor 24 and the grounded nozzle 10. The fuel, although a dielectric material, is charged by the electric field so that the spray characteristics which are normally a function of the surface tension forces inherent in the fuel, are also influenced by electrostatic forces. The electrostatic forces and thus the characteristics of the injected fuel spray may be modified by varying the potential of the conductor 24.

It should be apparent that different fuels may require different electrostatic forces to provide spray characteristics which optimize the engine performance for the specific fuel being used. In order to permit efficient operation of the combustion unit with various grades of fuel, it is necessary to determine the appropriate voltage to be applied to the conductor 24 for each grade of fuel. One method of determining the optimum voltage to be applied to the conductor 24 of the electrode 22, is to experimentally determine the optimum voltage level for each grade of fuel and then set the voltage applied to the conductor 24 by the power supply 31 to that predetermined level when the particular grade of fuel is being used.

The illustrated embodiment provides an alternative means of selecting the optimum applied voltage. In this case, the applied voltage is selected based on a measurement of an engine operating parameter. In particular, the temperature of the exit gases from the liner 12 is measured by the sensing device 35 at a predetermined air/fuel ratio. The voltage applied to the conductor 24 is then adjusted, either by manual or automatic control means represented by block 38, to maximize the temperature of the exit gas as shown for example on the readout device 36. In general, the efficiency is greatest when the exit gas temperature is maximized. However, pollution standards may require that a temperature other than the maximum be chosen as the optimum since the hottest combustion temperature will sometimes produce more undesirable effluents.

It can be seen that the present invention provides a simple technique for adapting gas turbine engines for efficient use with various grades of fuel. The present technique, which may be applied in principle to any existing gas turbine engine, is relatively inexpensive to implement and requires little modification to the existing structure and none to the most expensive element, the fuel injection nozzle. The electrical power and space required are negligible. The modification is expected to be safe and long-lasting.

Obviously many modifications and variations of the present invention are possible in the light of the above teachings. It is therefore to be understood that within the scope of the appended claims the invention may be practiced otherwise than as specifically described.

What is claimed is:

1. In a gas turbine engine wherein the fuel is injected through a spray injection nozzle into a combustion chamber, the improvement being apparatus for modifying the normal spray characteristics of the injected fuel so that fuels of higher aromatic content can be efficiently used in said engine, which comprises means for providing a variable electrostatic field within said combustion chamber in the vicinity of said injection nozzle, the fuel emerging from said nozzle being charged by said electrostatic field, whereby the spray characteristics of said fuel spray may be modified by adjusting the strength of the electrostatic field, said means for providing an electrostatic field including:

(a) an electrical conductor disposed in the pathh of said injected fuel spray;

(b) means for supplying a variable high voltage to said conductor;

(c) a first layer of high density insulating material covering said conductor for protecting said conductor from damage due to the high temperatures in the combustion unit and electrically insulating said conductor from the ground plane of the combustion chamber, a portion of the surface of said conductor being uncovered to provide an exposed high voltage surface for providing said electrostatic field;

(d) a second layer of high density insulating material disposed over said first layer of high density insulating material and separated from said layer of high density insulating material so that a passage is formed between the two layers; and (e) a source of inert gas coupled to said passage to provide a protective layer to insulate the exposed surface of the conductor from the flame.

2. In gas turbine engine of the type wherein the fuel is injected through a spray injection nozzle into a combustion chamber, the improvement being a method for modifying the characteristics of the fuel spray from the fuel injection nozzle so that fuels of higher aromatic content can be used efficiently in said engine, which comprises:

(a) providing a high strength electrostatic field within the combustion chamber in the vicinity of the injection nozzle to electrostatically charge the fuel as it emerges from the injection nozzle, said step of providing a high strength electrostatic field including:

(1) disposing a conductor within said combustion chamber;

(2) covering said conductor with an insulating cover to protect said conductor from the heat in the combustion chamber and to electrically insulate said conductor, a small surface of said conductor facing said injection nozzle remaining uncovered by said insulating cover;

(3) applying a high potential to said conductor; and (4) providing a flow of inert gas covering the uncovered surface of said conductor to electrically insulate said conductor from the flame in the combustion chamber;

(b) measuring an operating parameter of said engine that is indicative of the performance of said engine; and (c) setting the magnitude of said electrostatic field to optimize the performance of said engine as indicated by said operating parameter.

3. The improvement as recited in claim 1 wherein the exposed surface of said electrical conductor is disposed on the longitudinal axis of said injection nozzle.

4. The improvement as recited in claim 1 further comprising:

(a) temperature sensing means disposed to measure the temperature of the exit gases from said combustion chamber, the voltage provided by said means for supplying a variable high voltage being adjusted to provide a temperature of the exit gases which indicates optimum performance of said engine for said fuel.

5. A method as recited in claim 2 wherein said step of providing a high strength electrostatic field comprises:

(a) disposing an electrode in said combustion chamber so that said electrode provides a small charged surface facing said injection nozzle.

6. A method as recited in claim 5 wherein said step of disposing comprises disposing the electrode in said combustion chamber so that said charged surface is on the longitudinal axis of said injection nozzle.

7. A method as recited in claim 2 wherein the step of covering said conductor comprises covering said conductor with an insulating cover having a passage leading to said uncovered surface; and wherein the step of providing a flow of inert gas comprises the step of providing a flow of inert gas through said passage.

8. A method as recited in claim 2 wherein said step of measuring an operating parameter comprises measuring the temperature of the combustion gases in said combustion chamber.

9. A method as recited in claim 8 wherein said step of measuring the temperature of combustion gases comprises measuring the temperature of the combustion gases as they exit from said combustion chamber.

10. The improvement as recited in claim 3 further comprising:

(a) temperature sensing means disposed to measure the temperature of the exit gases from said combustion chamber, the voltage provided by said means for supplying a variable high voltage being adjusted to provide a temperature of the exit gases which indicates optimum performance of said engine for said fuel.

* * * * *